Figure 3:
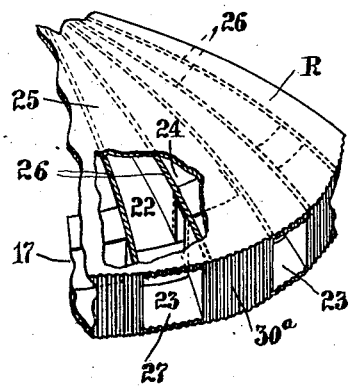

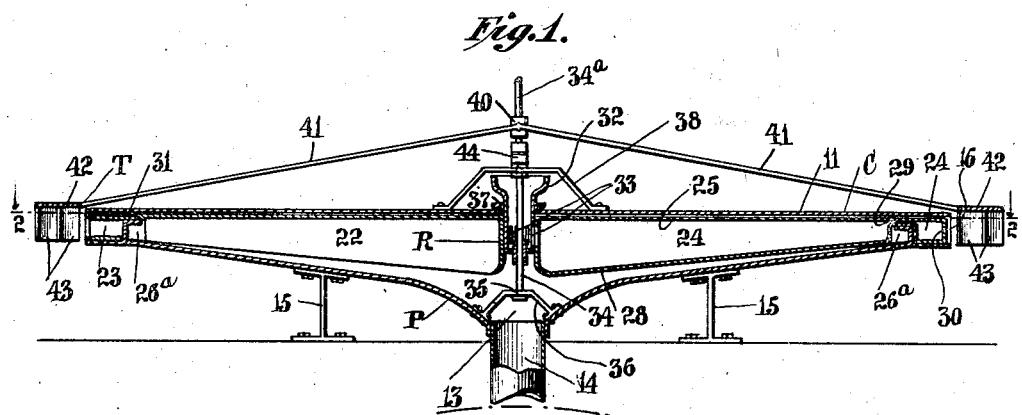

M. SEGUIN.
GAS ENGINE.
APPLICATION FILED NOV. 11, 1911.

1,186,950.

Patented June 13, 1916.
2 SHEETS—SHEET 2.

Attest:

Marc Seguin   Inventor:
by W. B. Whitney   Atty

UNITED STATES PATENT OFFICE.

MARC SEGUIN, OF ST. LOUIS, MISSOURI.

GAS-ENGINE.

1,186,950.   Specification of Letters Patent.   Patented June 13, 1916.

Application filed November 11, 1911. Serial No. 659,677.

*To all whom it may concern:*

Be it known that I, MARC SEGUIN, a citizen of the Republic of France, and resident of the city of St. Louis, in the State of Missouri, have invented certain new and useful Improvements in Gas-Engines, of which the following is a specification.

My invention relates to a gas engine of the turbine type, and has for its object to provide a practical gas turbine in which the ratio of negative work to gross work, or loss of energy due to change in direction of motion and to friction both of its mechanical parts and of the gaseous fuel, is reduced to a minimum.

The main advantages of a rotary over a reciprocating engine are continuity of torque and the elimination of reciprocating masses. To secure the latter advantage, in a gas engine, it is obviously necessary that a rotary compressor should be used in conjunction with the turbine wheel. But, whereas in the ordinary reciprocating engine compression is effected in the working cylinder where combustion takes place and with practically no losses except those due to friction, in all gas turbines heretofore constructed or contemplated, so far as I am aware, the compressed charges of fuel have been delivered to and fired in a separate stationary combustion chamber or chambers arranged to discharge the products of combustion through a nozzle against the blades of the turbine; and since, for a satisfactory degree of compression, the rotor element of the compressor must have a high velocity, which implies that the gaseous fuel must also move with great velocity, the amount of energy absorbed and wasted when these swiftly moving gases are delivered into a stationary combustion chamber, by which the direction of their motion is first changed and then that motion stopped altogether and in which the compression of the gases necessarily becomes considerably reduced, has been such as to more than counterbalance whatever other advantages such a compressor might possess. Moreover, the constant volume or explosion cycle, upon which practically all modern reciprocating engines operate, has thus far proven of little practical use in a gas turbine, because the stationary combustion chambers could not be charged and fired with sufficient rapidity to prevent an unsteady torque due to the necessarily intermittent action of such a cycle and the consequent varying pressures and velocities of the gases.

In order that it may show an efficiency which will make it of practical commercial value it is believed that a gas turbine, whether operated on the constant volume or constant pressure cycle, must satisfy the following conditions: The rotor of the compressor must revolve at high speed, otherwise there will be no compression of the gaseous fuel. The combined rotary and radial motion of the gases, once started, must be kept up without interference and with a gradual acceleration, which implies that all passages which would change the direction of or otherwise tend to check their motion and all valves, reciprocating parts, etc., must be eliminated. The compression must be gradual and continuous. And the gases must be fired and caused to expand while they are at their maximum speed and compression.

My invention therefore comprises broadly, as its principal feature, what I will call a rotary compressor, in which the gaseous fuel, drawn therein at atmospheric pressure or partially compressed, is thrown outwardly by the action of centrifugal force into the inner end of a revolving combustion chamber or chambers and the fuel charge within the chamber, compressed by centrifugal force, is, at one or more given points in the revolution of the chamber and while at its maximum speed and compression, fired and expanded against the blades or set of blades of a turbine suitably mounted either concentric with or eccentric to the axis of the compressor.

More specifically, this feature of my invention includes a rotor which has a series of peripheral combustion chambers, open at their inner and outer ends, and a series of radially disposed blades or partitions forming passages extending outwardly from near its center substantially to the inner ends of the combustion chambers; and, in its present form, I inclose this rotor element in a fixed outer casing which comprises an upper and lower wall, the latter provided with a centrally located inlet opening for the admission of the gaseous fuel to the inner ends of the radial passages of the rotor, and two rims, an outer peripheral rim which is adapted to close the outer ends of the combustion chambers except as it is cut away or provided with a nozzle at the point or points where the fuel charges are to be fired and an inner sectional rim or rims located substantially opposite the openings in the outer rim and adapted to close the inner ends of the combustion chambers when their outer ends are open, and provide an ignition system in connection with the inner or firing rim by which to fire the compressed charges within the combustion chambers at the proper time.

The invention also comprises the other novel features of construction and combination of parts hereinafter described and particularly pointed out in the claims.

Figure 4:
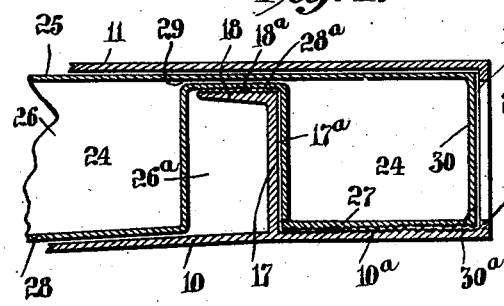
Figure 5:
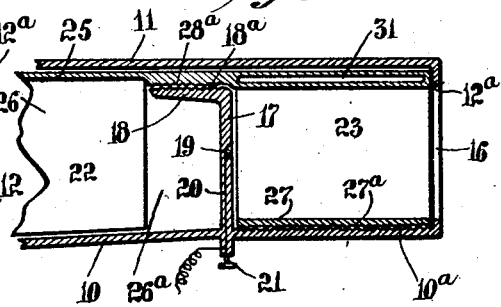
Figure 6:
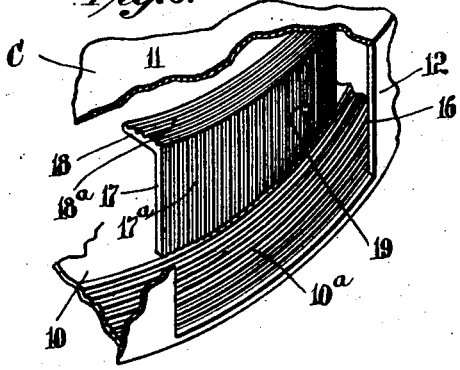

In the accompanying drawings, wherein the same parts are indicated throughout by the same reference characters, Figure 1 is a sectional view, on the line 1 1 of Fig. 2, of a rotary compressor with a turbine wheel mounted concentric therewith, illustrating one specific embodiment of my invention; Fig. 2, a sectional view of the same, on the line 2 2 of Fig. 1, with part of the upper wall of the rotor element of the compressor broken away to show the construction; Fig. 3, a broken detail showing, in perspective, the construction of the rotor; Figs. 4 and 5, enlarged broken sections on the lines 4 4 and 5 5 of Fig. 2, respectively; and Fig. 6, a broken detail showing, in perspective, a part of the casing of the compressor.

Referring to the drawings, P designates the rotary compressor, with its rotor R and casing C, and T the turbine, which constitute the principal parts of my improved gas turbine.

In the form illustrated in Figs. 1 to 6, the compressor casing consists of a circular bottom plate or wall 10 and top plate or wall 11 and an outer peripheral rim 12 which unites the edges of the two plates and constitutes the side wall of the casing. The bottom wall, inclined downwardly in a gradually increasing curve from its periphery to a central opening 13 to which is attached the end of an inlet-pipe 14 for the admission of the gaseous fuel from a carbureter or other suitable source of supply, is mounted upon supports 15 and carries the entire engine. The upper casing wall is flat and is provided with a central opening which forms a bearing for the rotor as hereinafter described. The rim is cut away at one or more points, here shown as two diametrically opposite each other, to form openings or nozzles 16 through which the products of combustion are discharged against the blades of the turbine wheel T. Opposite each of these openings in the outer rim is an inner sectional or firing rim 17, of substantially the same length as the discharge opening but located somewhat in advance thereof with respect to the direction of rotation of the rotor R, and is mounted upon the lower wall of the casing and at its upper edge terminates in an inwardly projecting flange 18 which extends parallel to and a short distance below the upper casing wall. Each of these inner firing rims is provided with a suitable ignition device 19, which is located in a recess in the outer face of the rim midway of its height and substantially opposite the forward edge of the discharge opening and which is electrically connected by wire 20 to binding-post 21 on the under side of the bottom casing wall and thence to any suitable source of electrical energy. Provision may be made for advancing or retarding the firing of the fuel charge by any suitable means for the forward and backward adjustment either of the firing rims upon the lower wall of the casing or of the ignition device upon the firing rims.

The rotor element of the compressor, which comprises a series of radially disposed and forwardly curved fuel passages 22, terminating outwardly in combustion chambers 23, and intermediate water chambers 24, forming part of a water cooling system, consists of a flat disk 25 on the under side of which are secured the curved blades 26. These blades are cut away at 26ª, immediately behind the inner end of the combustion chambers, so that they may move over and past the inner firing rims of the casing. An annular plate 27, secured to the lower edges of the blades, closes the lower side of the combustion as well as the water chambers. The fuel channels are left open along their lower sides; but the water chambers are inclosed by bottom plates 28, which fit over and around the space left for the inner firing rims and are secured at their outer ends to the inner edge of plate 27, leaving narrow channels 29 to connect the inner and outer portions of the chambers, and by curved end plates 30. Narrow channels 31, in the upper walls of the combustion chambers, connect together the two adjacent water chambers, and similar channels may, if desired, be provided in the lower wall of the chambers. At the axis of the rotor, a cylindrical cup 32, the upper end of which may be provided with any suitable radiating surface, is secured within a central opening in the plate 25 and to the inner end of the blades 26, and is connected with the water chambers through openings 33. The rotor is mounted within the casing by means of a shaft 34, which is fixed in the bottom of the cylindrical cup and is stepped at its lower end in a bearing 35, supported upon a spider-bracket 36 attached to the lower wall of the casing, and by a bearing 37 formed between the outside of the cylindrical cup and the circular opening in the upper wall of the casing. The upper end of the shaft may also be provided, if found desirable, with an additional bearing in a spider-bracket 38, attached to the upper wall of the casing. Ball-bearings should be provided in all cases. The outer walls of the rotor should not come into contact with the inner walls of the casing, but the adjacent fixed and rotating surfaces, particularly at the periphery of the compressor, should fit each other as closely as possible without actual contact; and to minimize the leakage and prevent back-firing one or both of the adjacent surfaces of the casing and rotor are grooved, as at 10$^a$, 12$^a$, 17$^a$, 18$^a$, 27$^a$, 28$^a$, and 30$^a$, to provide an air-packing for these open joints in the vicinity of the points where the charges in the combustion chambers are fired. The curvature of the rotor blades gives them a gradually increasing forward inclination which effects a gradual acceleration in the angular and hence rotative speed of the fuel as it is forced outwardly through the fuel passages, and the curvature should be such as to give to the combustion chambers a forward inclination, at the periphery of the rotor, substantially coincident with the direction of movement of the fuel charges, the resultant of their rotative and radial motions, thereby permitting the expanded charges to rush outwardly with as little disturbance as possible in the direction of their movement and consequently reducing losses of energy through friction to a minimum.

The turbine wheel, comprising a central hub 40, and radiating arms 41 which support an annular rim 42 provided with suitable depending blades 43, arranged in one or more stages as may be found desirable, is mounted upon the upper end of the rotor-shaft 35, or upon an upward extension 34$^a$ which is coupled thereto, as at 44, either directly or by means of a differential speed gearing.

In operation, the fuel valve having been opened and the engine cranked, the rotor draws the fuel through the inlet opening into the casing of the compressor, either at atmospheric pressure or under an initial compression, and forces it out, with a continuous and gradually increasing compression, through the fuel passages into the compression chambers, within which it is confined by the outer casing rim. Then, as the combustion chambers successively pass the forward end of an inner firing rim, the inner end of each is first closed thereby, cutting off the fuel charge therein from the supply passage, and immediately thereafter the chamber reaches the discharge opening, whereupon the ignition device fires the charge and the products of combustion, suddenly expanded, strike with dynamic force against the blades of the turbine wheel which is caused to revolve and in turn communicates its motion to the rotor of the compressor. After its charge has been fired, each revolving chamber will first reach the rear end of the firing rim, whereupon the fuel from the communicating fuel passage will rush into and through it, clearing it of all burnt gases, and then its outer end will again be closed by the outer rim and it will receive another fuel charge, which will in turn be cut off from the supply and fired when the chamber reaches the next firing rim and discharge opening. As the engine speeds up, the fuel charges will be more and more compressed within the combustion chambers, and the dynamic force of their combustion will have increasing effect. While the engine is running there will be a constant circulation of water through the water cooling system, since the cooler water will, because of its greater density, be forced out to the periphery of the rotor, displacing the water which has become heated around and between the combustion chambers and driving it back to the center of the compressor, where it will be cooled and again forced outwardly.

It may of course be found possible to simplify or otherwise improve the water cooling system hereinabove described, or even to dispense with it altogether.

While I have hereinabove explained the principle of my invention and have specifically illustrated and described the best mode in which I have thus far contemplated applying that principle, it will be understood that the invention may be variously modified in its details, such as the construction, form, proportions, and arrangement of its several parts, without departing from the spirit or sacrificing the advantages thereof. Such other modifications may also be made as fall within the scope of the appended claims.

What I claim as new, and desire to secure by Letters Patent, is—

1. A gas engine comprising as an element a rotor whose walls form a radially disposed passage which extends outwardly without interruption or restriction from near its center to its periphery, and is adapted, in combination with a suitable stator element, to form a compression and combustion chamber.

2. A gas engine comprising as an element a rotor whose walls form a radially disposed passage which extends outwardly without interruption or restriction from near its center to its periphery and which is open on one side for the inner portion and is closed on all sides for the outer portion of its length.

3. A gas engine comprising as an element a rotor whose walls form a radially disposed passage which extends outwardly without interruption or restriction from near its center to its periphery and is curved so as to have a gradually increasing forward inclination from its inner to its outer end.

4. A gas engine comprising as an element a rotor whose walls form a peripheral chamber which is open at its inner and outer ends and a radially disposed passage which extends outwardly from near the center of the rotor to and except periodically in its rotation communicates without interruption or restriction with the inner end of the chamber.

5. A gas engine comprising as an element a rotor whose walls form a peripheral chamber which is open at its inner and outer ends and has a forward inclination with respect to its direction of rotation and a passage which extends with a forward curvature from near the center of the rotor to and except periodically in its rotation communicates uninterruptedly with the inner end of the peripheral chamber.

6. A gas engine comprising as an element a rotor with radially disposed blades forming a series of passages which extend outwardly without abrupt change in the direction of their walls or in their sectional area from near the center to the periphery of the rotor, the outer portions of said passages being closed on four sides to constitute open ended peripheral chambers.

7. A gas engine comprising as an element a rotor with radially disposed curved blades forming a series of passages which extend outwardly with a gradually increasing forward inclination from near the center to the periphery of the rotor, the outer end portions of said passages being closed on four sides to constitute a series of open ended peripheral chambers.

8. A gas engine comprising, in combination, a rotor with walls forming a plurality of peripheral chambers open at their inner and outer ends and a plurality of radially disposed passages each extending outwardly from near the center to and except periodically communicating uninterruptedly with the inner end of a chamber, means for supplying fuel to said passages, means for closing the outer ends of said chambers except at one or more points in their revolution, and means for closing the inner ends of and firing the fuel charge within said chambers at a point or points in suitable relation to the unclosing period of their outer ends.

9. A gas engine comprising, in combination, a rotor with walls forming a plurality of peripheral chambers open at their inner and outer ends and radially disposed gas passages extending outwardly from near its center to and except periodically communicating uninterruptedly with the inner ends of the chambers and a stationary casing which incloses the rotor and is provided with a centrally located inlet opening adapted to admit fuel to the inner ends of said gas passages, an outer peripheral rim adapted to close the outer ends of said chambers except at one or more points where said rim is cut away to provide a discharge opening, an inner segmental rim adapted to close the inner end of each of said chambers when its outer end is in proximity to a discharge opening in the outer rim, and means for igniting the fuel charge within each of said chambers at suitably timed intervals.

10. A gas engine comprising as elements a rotor whose walls form a plurality of forwardly inclined chambers open at their inner and outer ends, radially disposed passages extending with a gradually increasing forward curvature from near its center to and except periodically communicating uninterruptedly with the inner ends of the chambers and a stationary casing whose walls form a central inlet opening for the admission of fuel to the inner ends of the radially disposed passages of the rotor and a closure for the outer ends of the chambers of the rotor except at one or more points in its revolution where a discharge opening is provided and at such point or points a closure for the inner ends of the chambers.

11. A gas engine comprising, in combination, a rotor containing a series of peripheral combustion chambers which are forwardly inclined from their inner to their outer ends and are open at such ends and means for supplying a gaseous fuel to the inner ends of said combustion chambers by the action of centrifugal force and with a rotative speed which is gradually accelerated until it equals that of the inner ends of said combustion chambers, stationary means for closing the outer ends of said combustion chambers except at one or more given points in their revolution and at such point or points closing their inner ends, and means for firing the fuel charge in each of said combustion chambers at intervals suitably timed with respect to the closing of its inner and unclosing of its outer ends.

12. A gas engine comprising, in combination, a rotor having formed therein a series of peripheral combustion chambers which are forwardly inclined from their inner to their outer ends and are open at such ends and radially disposed fuel passages adapted to receive a fuel supply and move it outwardly with a gradually increasing rotative speed to the inner ends of the combustion chambers and a casing for said rotor which has an inlet opening adapted to admit fuel to the inner ends of said fuel passages and walls adapted to close the outer ends of said combustion chambers except at one or more suitable points in their revolution at which the casing is provided with a discharge opening and to close the inner ends of and fire the fuel charge within said combustion chambers when their outer ends are in suitable relation with a discharge opening.

13. A gas engine comprising, in combination, a rotor containing a series of peripheral combustion chambers open at their inner and outer ends and a series of water chambers intermediate said combustion chambers, means for supplying gaseous fuel to the inner ends of said combustion chambers by the action of centrifugal force, means for closing the outer ends of said combustion chambers except at one or more points in their revolution, means for closing the inner ends of said combustion chambers and for firing the fuel charges therein at a point or points suitably located with respect to the unclosing of their outer ends, and a water tank provided with radiating surfaces and communicating with the inner ends of said water chambers.

14. In a gas engine, the combination of a rotor containing a peripheral combustion chamber open at its inner and outer ends and a radially disposed passage adapted to receive fuel and carry it outwardly to the inner end of the combustion chamber, a stationary casing having an inlet opening adapted to admit the fuel to the inner end of said fuel passage and walls adapted to close the outer end of said combustion chamber except at a given point in its revolution and at such point to close its inner end, means for firing the fuel charge within said combustion chamber at intervals suitably timed with respect to the closing of its inner and unclosing of its outer ends, and a turbine mounted so that its blades shall pass in close proximity to the outer end of said combustion chamber at the point where its fuel charge is fired and connected to rotate with the rotor.

15. In a gas engine, the combination of a rotor having formed therein a series of peripheral chambers open at their outer and inner ends and a corresponding series of radially disposed fuel passages extending outwardly from near its center to and except periodically communicating uninterruptedly with the inner ends of the chambers, a casing having a centrally located inlet opening connected with a fuel supply and adapted to admit fuel to the inner ends of said fuel passages, an outer rim adapted to close the outer ends of said chambers except at a point or points where it is cut away to provide a discharge opening, and a segmental inner firing rim suitably located substantially opposite the point or points where the outer end is cut away and adapted to close the inner end of said chambers and to fire the fuel charge therein, and a turbine mounted concentric and to rotate with the rotor and having a series of peripheral blades the inner ends of which rotate in close proximity to the outer rim of the casing.

16. In a gas engine, the combination with a turbine T of a rotary compressor P, comprising a rotor R provided with curved fuel passages 22 and forwardly inclined combustion chambers 23 and a casing C provided with inlet and discharge openings and means for closing the outer ends of said combustion chambers except at such discharge opening and means at said opening for closing the inner ends of said combustion chambers, the said turbine being so mounted as to receive upon its blades the products of combustion from said discharge opening and connected to rotate with said rotor.

17. The combination with the turbine T of the rotary compressor P, the said rotary compressor comprising the rotor R with fuel passages 22 and combustion chambers 23 and the casing C with inlet opening 13, outward peripheral rim 12 cut away to form openings 16 and inner firing rims 17 carrying ignition devices 19, substantially as described.

18. In a gas engine, the combination of a turbine and a rotor element connected to rotate with the turbine and provided with a series of radially disposed passages which are without abrupt change in the direction of their walls and in their sectional area and are adapted to receive a supply of gaseous fuel at their inner ends near the center of the rotor element, to carry such fuel outwardly without abrupt change in the velocity of its movement, to provide chambers within which to fire the fuel, and to discharge the products of combustion through their open outer ends against the blades of the turbine.

19. In a gas engine, the combination of a turbine, a rotor provided with a series of radially disposed passages which extend outwardly from near the center to the periphery of the rotor without abrupt change in the direction of their walls and are open at their outer ends, means for supplying gaseous fuel to the inner ends of the passages in the rotor, and means for firing said fuel within the outer ends of said passages, the rotor being connected to rotate with the turbine and discharging the products of combustion from the open outer ends of its passages against the blades of the turbine.

20. In a gas engine, the combination of a turbine, a rotor provided with radially disposed curved blades forming a series of passages which extend outwardly from near the center to the periphery of the rotor with a gradually increasing inclination forwardly in the direction of its rotation, means for supplying gaseous fuel to the inner ends of the said passages near the center of the rotor, and means for firing said fuel within the outer ends of said passages, the rotor being connected to rotate with the turbine and discharging the products of combustion from the open outer ends of said passages against the blades of the turbine.

MARC SEGUIN.

Witnesses:
H. J. HARMS,
J. B. BLACK.